United States Patent
Nakamura et al.

(10) Patent No.: US 12,152,957 B2
(45) Date of Patent: Nov. 26, 2024

(54) INUNDATION DETECTION SYSTEM AND INUNDATION DETECTION METHOD

(71) Applicant: NIPPON TELEGRAPH AND TELEPHONE CORPORATION, Tokyo (JP)

(72) Inventors: Atsushi Nakamura, Musashino (JP); Nazuki Honda, Musashino (JP); Hiroyuki Oshida, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 281 days.

(21) Appl. No.: 17/798,101

(22) PCT Filed: Feb. 28, 2020

(86) PCT No.: PCT/JP2020/008466
§ 371 (c)(1),
(2) Date: Aug. 8, 2022

(87) PCT Pub. No.: WO2021/171598
PCT Pub. Date: Sep. 2, 2021

(65) Prior Publication Data
US 2023/0126470 A1    Apr. 27, 2023

(51) Int. Cl.
*G01M 11/02* (2006.01)
(52) U.S. Cl.
CPC .................. *G01M 11/0285* (2013.01)
(58) Field of Classification Search
CPC .... G01M 11/0285; G01M 11/31; G01M 3/38; Y02A 50/00

(Continued)

(56) References Cited

U.S. PATENT DOCUMENTS 5,696,863 A * 12/1997 Kleinerman .......... G06F 3/0421
385/12
5,991,479 A * 11/1999 Kleinerman ....... G01D 5/35358
385/32

(Continued)

FOREIGN PATENT DOCUMENTS

WO    WO-2020/158033 A1    8/2020

OTHER PUBLICATIONS

S. Tomita, H. Tachino, and N. Kasahara, "Water sensor with optical fiber", Journal of Lightwave Technology, vol. 8, No. 12, pp. 1829-1832, 1990.

*Primary Examiner* — Isiaka O Akanbi (57) ABSTRACT

An object of the present invention is to provide an immersion detection system and an immersion detection method capable of eliminating module replacement in the occurrence of immersion and simplifying system management. An immersion detection system according to the present invention includes: an immersion detection sensor having two optical fibers connected in series such that end faces of the two optical fibers abut on each other with a predetermined gap; an optical measurer that causes test light with a plurality of wavelengths to enter an optical transmission line having a plurality of the immersion detection sensors connected in series with optical fibers and measures a return loss of the test light at the immersion detection sensor for each of the wavelengths and for each of the immersion detection sensors; and a determiner that averages, for each of the immersion detection sensors, the return losses for the wavelengths and performs threshold determination on the presence or absence of immersion.

8 Claims, 5 Drawing Sheets

(58) Field of Classification Search
USPC .......................................................... 356/73.1
See application file for complete search history.

(56) References Cited

U.S. PATENT DOCUMENTS

| | | | |
|---|---|---|---|
| 10,190,970 B2* | 1/2019 | Albert | G01N 21/553 |
| 11,747,294 B2* | 9/2023 | Noto | G01N 25/68 |
| | | | 356/73.1 |
| 11,754,465 B2* | 9/2023 | Nakamura | G01M 11/3154 |
| | | | 356/73.1 |
| 2009/0162076 A1* | 6/2009 | Wang | G01N 17/02 |
| | | | 398/185 |
| 2022/0120635 A1* | 4/2022 | Nakamura | G01M 11/3145 |
| 2023/0073833 A1* | 3/2023 | Yano | G01L 11/025 |
| 2023/0085614 A1* | 3/2023 | Noto | G01K 11/322 |
| | | | 356/73.1 |
| 2024/0085180 A1* | 3/2024 | Yano | G01V 1/00 |

\* cited by examiner

INUNDATION DETECTION SYSTEM AND INUNDATION DETECTION METHOD

CROSS-REFERENCE TO RELATED APPLICATIONS

This application is a 371 U.S. National Phase of International Application No. PCT/JP2020/008466, filed on Feb. 28, 2020. The entire disclosure of the above application is incorporated herein by reference.

TECHNICAL FIELD

The present disclosure relates to an immersion detection system and an immersion detection method for detecting immersion of a connection portion on an optical fiber cable.

BACKGROUND ART

It is known that when an optical fiber connection portion is left in an immersed state for many hours, mechanical strength of the optical fiber deteriorates. Accordingly, in order to maintain reliability of an optical fiber network, it is required to detect the presence or absence of immersion on optical fiber connection portions to repair the place(s) of immersion.

Non Patent Literature 1 discloses, as a method of detecting the presence or absence of immersion on an optical fiber connection portion, a method using an immersion detection module composed of an optical fiber and a water absorbing and expanding material. This immersion detection module has a structure in which, in the occasion of immersion, the swelling member having undergone volume expansion is to press the optical fiber inserted into the module, and thereby, causes the optical fiber to bend, which results in the occurrence of a bending loss. Monitoring the presence or absence of the bending loss occurring in the occasion of immersion using an OTDR (Optical Time Domain Reflectometer) or the like enables the presence or absence of immersion to be detected.

CITATION LIST

Non-Patent Literature

Non Patent Literature 1: S. Tomita, H. Tachino, and N. Kasahara, "Water sensor with optical fiber", Journal of Lightwave Technology, vol. 8, no. 12, pp. 1829-1832, 1990.

SUMMARY OF THE INVENTION

Technical Problem

However, a conventional immersion detection method as disclosed in Non Patent Literature 1 cannot reuse an immersion detection module that is once immersed, which has caused a problem that modules need to be replaced every time when immersion occurs and that simplification of system management is difficult.

In order to solve the aforementioned problem, an object of the present invention is therefore to provide an immersion detection system and an immersion detection method capable of eliminating module replacement in the occurrence of immersion and simplifying system management.

Means for Solving the Problem

In order to achieve the aforementioned object, in an immersion detection system and an immersion detection method according to the present invention, there is used an immersion detection sensor having optical fibers the end portions of which abut on each other with a predetermined gap.

Specifically, there is provided an immersion detection system according to the present invention including:
an immersion detection sensor having two optical fibers connected in series such that end faces of the two optical fibers abut on each other with a predetermined gap;
an optical measurer that causes test light with a plurality of wavelengths to enter an optical transmission line having a plurality of the immersion detection sensors connected in series with optical fibers and measures a return loss of the test light at the immersion detection sensor for each of the wavelengths and for each of the immersion detection sensors; and
a determiner that averages, for each of the immersion detection sensors, the return losses for each of the wavelengths and performs threshold determination on the presence or absence of immersion.

Moreover, there is provided an immersion detection method according to the present invention for performing:
configuring an immersion detection sensor by connecting two optical fibers in series such that end faces of the two optical fibers abut on each other with a predetermined gap;
configuring an optical transmission line by connecting a plurality of the immersion detection sensors in series with the optical fibers;
inputting test light with a plurality of wavelengths to the optical transmission line;
measuring a return loss of the test light at the immersion detection sensor for each of the wavelengths and for each of the immersion detection sensors;
averaging, for each of the immersion detection sensors, the return losses for each of the wavelengths; and
performing threshold determination on the presence or absence of immersion.

Since the immersion detection sensor used in this immersion detection system and this immersion detection method has a structure in which the end faces of the optical fibers abut on each other with a certain gap, it can be reused after being dried even in the case of its immersion. Accordingly, the present invention can provide an immersion detection system and an immersion detection method capable of eliminating module replacement in the occurrence of immersion and simplifying system management.

This immersion detection system and this immersion detection method are characterized in that, in the threshold determination,
the return losses for each of the wavelengths are averaged on a linear scale to calculate an effective return loss,
a threshold in the threshold determination is set on the basis of a difference between an effective return loss in a case where a medium which the predetermined gap is filled with air and an effective return loss in a case where a medium which the predetermined gap is filled with water, and
it is determined that immersion of the immersion detection sensor occurs, when the calculated effective return loss is larger than the threshold.

This immersion detection system and this immersion detection method are characterized in that the wavelength of the test light is set
to a wavelength at which a minimum value of the effective return loss calculated in a case where the immersion detection sensor is immersed is smaller than a maximum value of the effective return loss calculated in a case where the immersion detection sensor is not immersed.

This immersion detection system and this immersion detection method are characterized in that the threshold is set to a value between a maximum value of the effective return loss calculated in a case where the immersion detection sensor is not immersed and a minimum value of the effective return loss calculated in a case where the immersion detection sensor is immersed.

Notably, the aforementioned inventions can be combined as far as possible.

Effects of the Invention

The present invention can provide an immersion detection system and an immersion detection method capable of eliminating module replacement in the occurrence of immersion and simplifying system management.

DESCRIPTION OF EMBODIMENTS

An embodiment of the present invention is described with reference to the accompanying drawings. The embodiment described below is an example of the present invention, and the present invention is not limited to the embodiment below. Notably, it is supposed that the constituents with the same signs in the present specification and the drawings are the same as each other.

Figure 1:
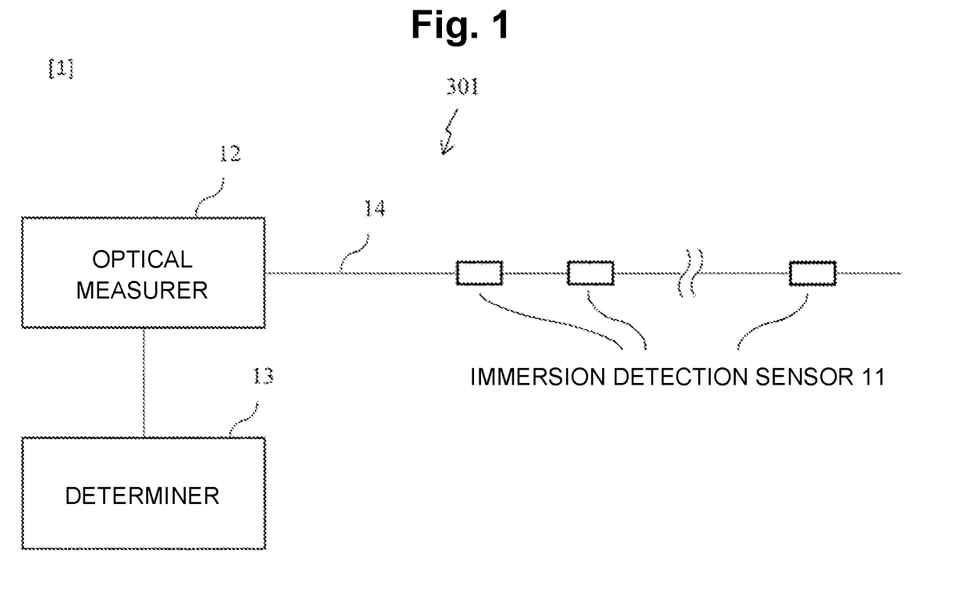
FIG. 1 is a diagram for explaining an immersion detection system according to the present invention.

FIG. 1 is a diagram for explaining an immersion detection system 301 of the present embodiment. The immersion detection system 301 is an immersion detection system for detecting immersion of a connection portion on an optical fiber cable.

The immersion detection system 301 includes:
an immersion detection sensor 11 having two optical fibers 14 connected in series such that end faces of the two optical fibers 14 abut on each other with a predetermined gap;
an optical measurer 12 that causes test light with a plurality of wavelengths to enter an optical transmission line having a plurality of the immersion detection sensors 11 connected in series with optical fibers 14 and measures a return loss of the test light at the immersion detection sensor 11 for each of the wavelengths and for each of the immersion detection sensors 11; and
a determiner 13 that averages, for each immersion detection sensor 11, the return losses for the wavelengths and performs threshold determination on the presence or absence of immersion.

The optical measurer 12 measures distribution data of amounts of reflection on optical fibers to be measured, using reflection measurement such as an OTDR, and acquires return losses arising at the immersion detection sensors 11. The optical measurer 12 acquires the return losses for the plurality of wavelengths and outputs information of the return losses for the wavelengths. Moreover, the determiner 13 receives information of the return losses and determines, for each immersion detection sensor 11, the presence or absence of immersion on the basis of the received return loss information to output the determination result.

Figure 2:
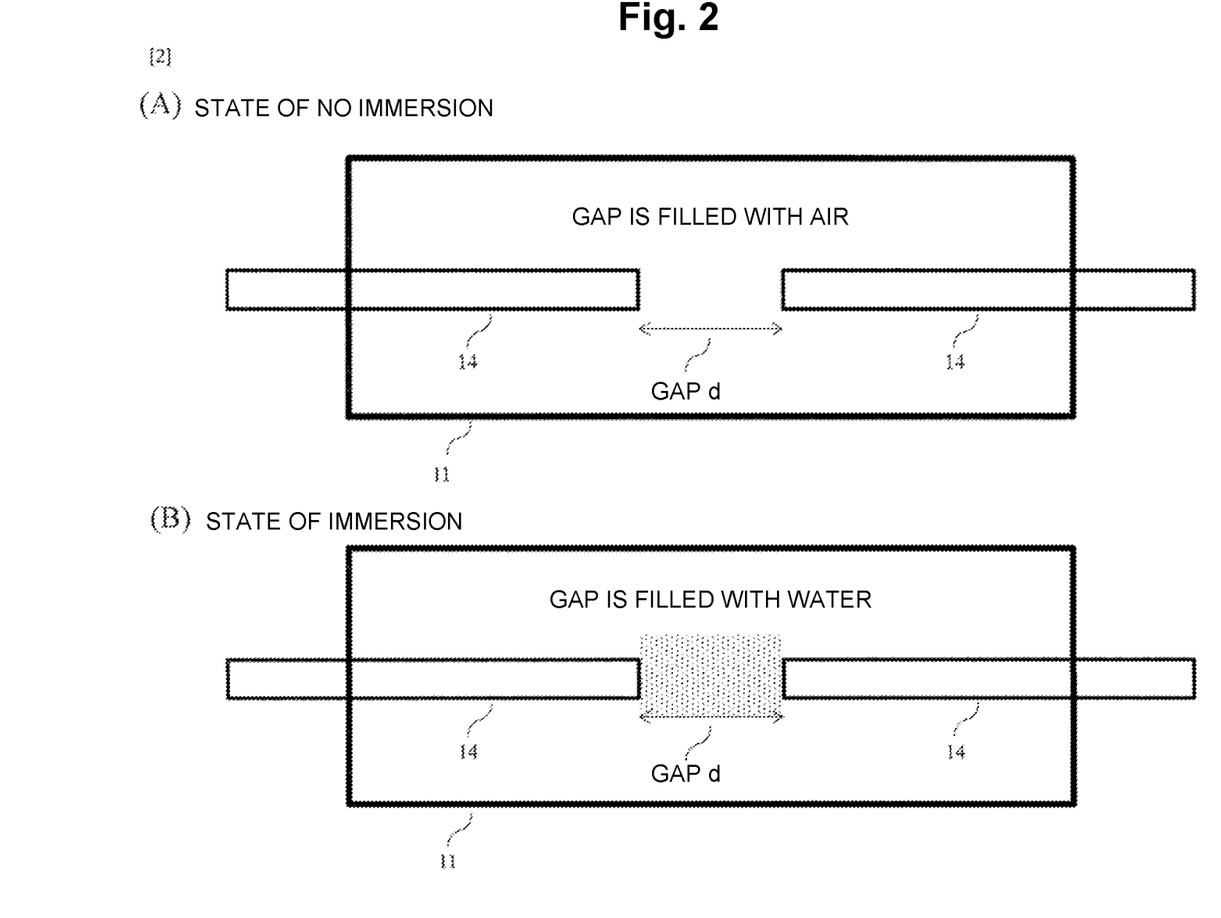
FIG. 2 shows diagrams for explaining an immersion detection sensor included in the immersion detection system according to the present invention.

FIG. 2 shows diagrams for explaining a structure of the immersion detection sensor 11. The immersion detection sensor 11 has a structure in which the end faces of the optical fibers connected to face each other are caused to abut on each other and which provides a gap d for allowing immersion with water between the end faces of the optical fibers. While in FIG. 2, a pair of optical fibers 14 connected to face each other are exemplarily illustrated, two pairs or more of optical fibers connected to face each other may be used. When the immersion detection sensor 11 is not immersed in water (FIG. 2(A)), the gap d is filled with air. On the other hand, when the immersion detection sensor 11 is immersed in water (FIG. 2(B)), the gap d is filled with water. Such change of the medium which the gap d is filled with depending on the presence or absence of immersion as above changes the return loss at the immersion detection sensor 11. Accordingly, the immersion detection system 301 determines the presence or absence of immersion using the characteristics that the return loss changes depending on the presence or absence of immersion.

Figure 3:
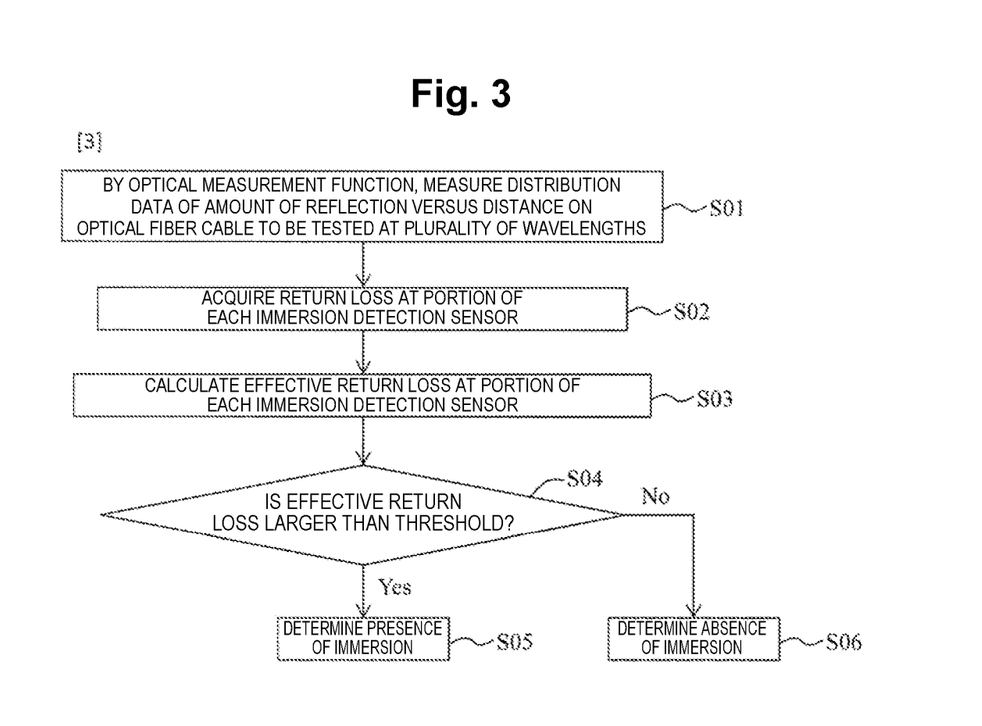
FIG. 3 is a diagram for explaining an immersion detection method according to the present invention.

The immersion detection system 301 is operated in accordance with an immersion detection method as in FIG. 3. The immersion detection method is an immersion detection method for detecting the immersion of the connection portion on the optical fiber cable and is characterized by performing an optical measurement step S01, a return loss measurement step S02, an effective return loss calculation step S03 and an immersion determination step S04.

In the optical measurement step S01, distribution data of amounts of reflection is measured at a plurality of test wavelengths by optical measurement to propagate test light and to acquire information on a distance on the optical fiber cable.

In the return loss measurement step S02, a return loss at the immersion detection sensor installed in the connection portion on the optical fiber cable is acquired.

In the effective return loss calculation step S03, an effective return loss at the portion of the immersion detection sensor is calculated on the basis of return losses at the plurality of wavelengths.

In immersion determination step S04, the effective return loss and a threshold are compared with each other to determine the presence or absence of immersion.

Notably, not described in FIG. 3, before the optical measurement step S01, it is needed to configure the immersion detection sensor 11 by connecting the two optical fibers 14 in series such that the end faces of the two optical fibers 14 abut on each other with the predetermined gap d. Furthermore, it is needed to configure the optical transmission line by connecting a plurality of the immersion detection sensors 11 in series with the optical fibers 14.

In the optical measurement step S01, the optical measurer 12 performs:
causing the test light with the plurality of wavelengths to enter the optical transmission line; and measuring the return loss of the test light at the immersion detection sensor 11 for each of the wavelengths and for each of the immersion detection sensors 11.

In the return loss measurement step S02 to the immersion determination step S04, the determiner 13 performs: for each of the immersion detection sensors, averaging the return losses for the wavelengths; and performing threshold determination on the presence or absence of immersion.

Figure 5:
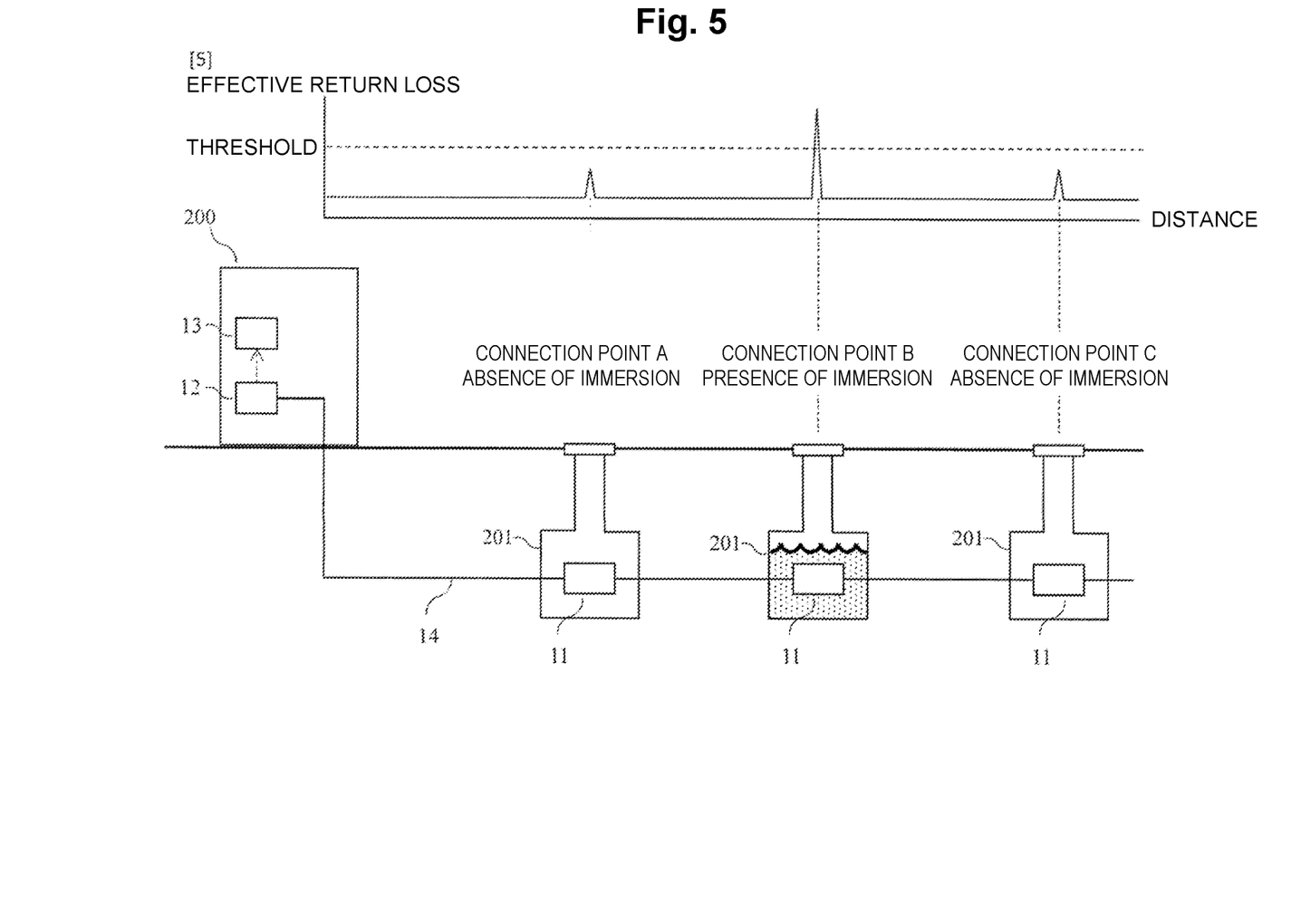
FIG. 5 is a diagram for explaining an immersion detection system according to the present invention.

FIG. 5 is an image diagram of an optical communication system which the immersion detection system 301 is applied to. Not shown in FIG. 5, an optical fiber cable extends from a communication facility building 200 and there exist connection points between optical fiber cables in closures 201. The optical measurer 12 and the determiner 13 are arranged in the communication facility building 200. The immersion detection sensors 11 are arranged in the closures 201. The optical fibers 14 may be arranged in parallel to the optical fiber cable or may be arranged on an alternative pass to that for the optical fiber cable (note that the immersion detection sensors 11 should be in the closures 201.)

Arranging the immersion detection system 301 as in FIG. 5 makes it possible to grasp immersion situations of the closures 201 from the communication facility building 200. The details are described below.

First, in order to measure the return losses at all the immersion detection sensors 11 arranged in the closures 201, optical measurement is performed by the optical measurer 12 arranged in the communication facility building 200. The optical measurement is reflection measurement with an OTDR, for example. From distribution data of amounts of reflection measured at a plurality of wavelengths by the optical measurement, the return loss at each wavelength at the position of each immersion detection sensor 11 is acquired. The determiner 13 calculates the effective return loss and compares it with a threshold, and thereby, determines the presence or absence of immersion at the position of each immersion detection sensor 11.

The determiner 13 averages the return losses for the wavelengths on a linear scale to calculate the effective return loss as below.

[Details of Calculation Method of Effective Return Loss]

The effective return loss is calculated using Expression (1) and Expression (2) below.

[Math. 1]

$$R_{\mathit{eff}} = \frac{1}{N}\sum_{i=1}^{N} R_i(\lambda_i) \qquad (1)$$

[Math. 2]

$$RL_{\mathit{eff}} = -10\log_{10}(R_{\mathit{eff}}) \qquad (2)$$

Herein, $R_{\mathit{eff}}$ designates the average value of reflectances (linear scale) obtained at the plurality of wavelengths. N designates the number of the wavelengths used for a test, and $R_i(\lambda_i)$ designates a reflectance (linear scale) at a wavelength $\lambda_i$. $RL_{\mathit{eff}}$ designates the desired effective return loss, which is a value obtained by logarithmic presentation of the reciprocal number of Expression (1).

The determiner 13 sets the threshold in the threshold determination on the basis of a difference between an effective return loss in the case where the medium which the predetermined gap d is filled with is air and an effective return loss in the case of water as below. Furthermore, the determiner 13 determines that immersion of the immersion detection sensor 11 occurs, when the calculated effective return loss is larger than the threshold.

[Details of Calculation Method of Threshold]

There is described a calculation method of the threshold for determining the presence or absence of immersion on the basis of the effective return loss. This threshold is calculated on the basis of values which the effective return loss can take in the case of no immersion (case where a medium which the gap d is filled with is air) and in the case of immersion (case where the medium which the gap d is filled with is water).

A Fresnel reflectance $R_i$ arising at an optical fiber connection portion having a gap is expressed by

[Math. 3]

$$R_i = \frac{4R_0\sin^2\left(\frac{2\pi n d}{\lambda_i}\right)}{(1 - R_0)^2 + 4R_0\sin^2\left(\frac{2\pi n d}{\lambda_i}\right)} \qquad (3)$$

Herein, $R_0$ is defined by Expression (4) below

[Math. 4]

$$R_0 = \left(\frac{n_1 - n}{n_1 + n}\right)^2 \qquad (4)$$

Herein, $n_1$ is the refractive index of the optical fiber. n is the refractive index of a medium which the gap is filled with, in other words, the refractive index of air in the case of no immersion and the refractive index of water in immersion. d is the distance of the gap.

From Expression (1) to Expression (4), values can be calculated which the effective return loss can take in the case where the medium which the gap d is filled with is air and in the case of water. The threshold is set to a value in a region which is between the range of the effective return loss in the case where the medium which the gap d is filled with is air and the range of the effective return loss in the case where the medium which the gap d is filled with is water and in which they do not overlap with each other. Specifically, the threshold is set to a value between the maximum value of the effective return loss calculated in the case where the immersion detection sensor 11 is not immersed and the minimum value of the effective return loss calculated in the case where the immersion detection sensor 11 is immersed.

Notably, the return loss varies depending on the wavelength of the test light. Therefore, the wavelength of the test light is desirably set to a wavelength at which the minimum value of the effective return loss calculated in the case where the immersion detection sensor 11 is immersed is smaller than the maximum value of the effective return loss calculated in the case where the immersion detection sensor 11 is not immersed.

Figure 4:
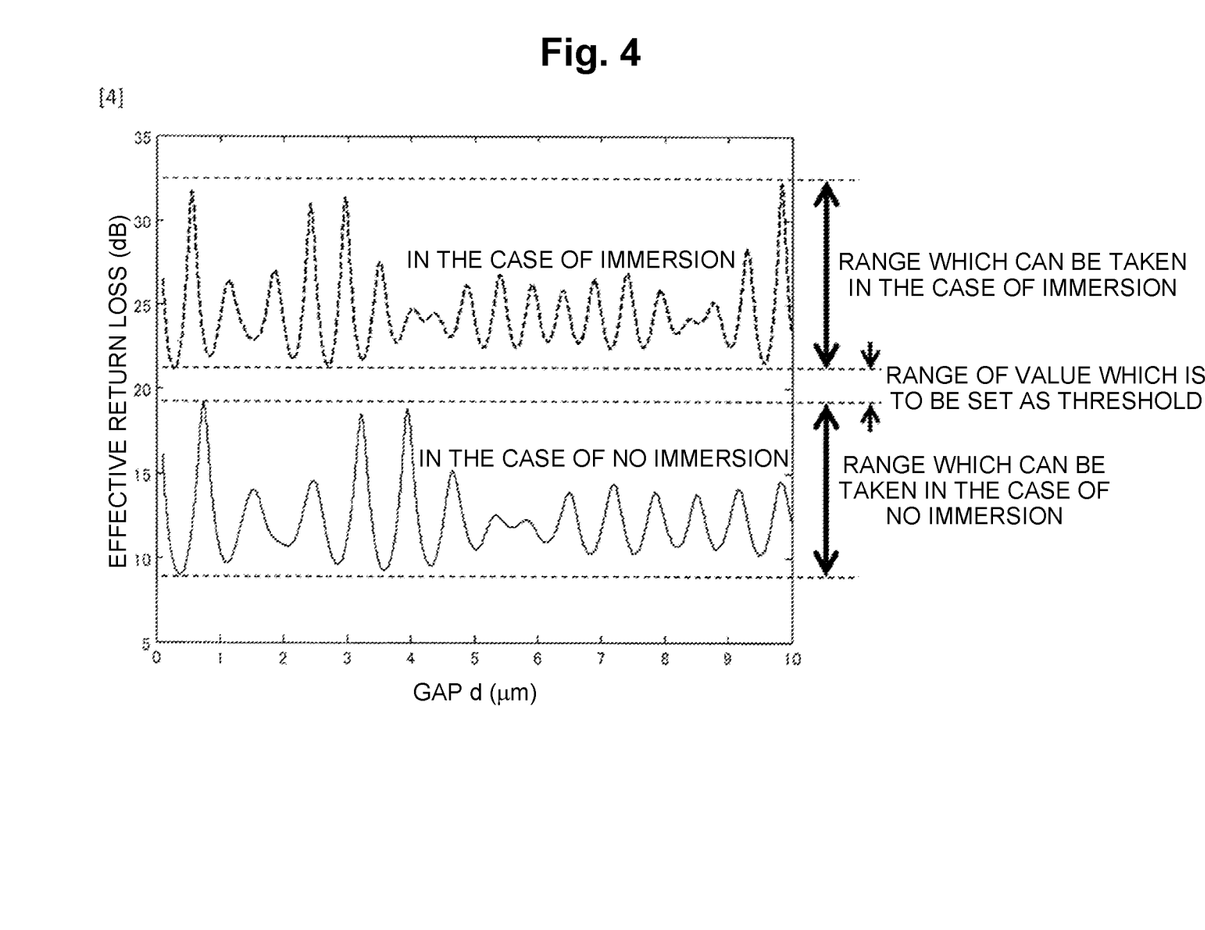
FIG. 4 is a diagram for explaining setting of a threshold in the immersion detection method according to the present invention.

FIG. 4 shows exemplary calculation of the values which the effective return loss can take. It is herein supposed that the refractive indices of air and water are 1.00 and 1.33, respectively, and the refractive index $n_1$ of the optical fiber is 1.454. Moreover, the test wavelengths are 1310 nm, 1550 nm and 1625 nm. In this case, since the maximum value which the effective return loss can take in the case of no immersion is about 19.2 dB and the minimum value which the effective return loss can take in immersion is about 21.1 dB, the threshold is set to a value between these, for example, 20.1 dB.

The threshold for the effective return loss is not limited to the aforementioned value and can be appropriately set in accordance with wavelengths used for the test.

As above, by setting the wavelengths of the test light and the threshold, the immersion detection system 301 can obtain a distribution of the effective return loss as in FIG. 5 and can specify the closure 201 of immersion on the basis of the set threshold. In the case of FIG. 5, since the waveform of reflection at a closure 201 #B exceeds the threshold, it can be determined that immersion occurs at the closure 201 #B.

Notably, this invention is not limited to the aforementioned embodiment and can be modified and carried out in various ways without departing from the spirit of this invention.

In other words, this invention is not limited precisely to the aforementioned embodiment and can be embodied in the stage of being carried out with constituents thereof modified without departing from the spirit. Moreover, various inventions may be formed with proper combinations of constituents disclosed for the aforementioned embodiment. For example, some constituents may be eliminated from all the constituents described for the embodiment. Furthermore, constituents of different embodiments may be properly combined.

REFERENCE SIGNS LIST

11 Immersion detection sensor
12 Optical measurer
13 Determiner
14 Optical fiber
200 Communication facility building
201 Closure
301 Immersion detection system

The invention claimed is:

1. An immersion detection system comprising:
    an immersion detection sensor having two optical fibers connected in series such that end faces of the two optical fibers abut on each other with a predetermined gap;
    an optical measurer that causes test light with a plurality of wavelengths to enter an optical transmission line having a plurality of the immersion detection sensors connected in series with the optical fibers and measures a return loss of the test light at the immersion detection sensor for each of the wavelengths and for each of the immersion detection sensors; and
    a determiner that averages, for each of the immersion detection sensors, the return losses for each of the wavelengths and performs threshold determination on the presence or absence of immersion.

2. The immersion detection system according to claim 1, wherein the determiner:
    averages the return losses for each of the wavelengths on a linear scale to calculate an effective return loss;
    sets a threshold for the threshold determination on the basis of a difference between an effective return loss in a case where a medium which the predetermined gap is filled with air and an effective return loss in a case where a medium which the predetermined gap is filled with water; and
    determines that immersion of the immersion detection sensor occurs, when the calculated effective return loss is larger than the threshold.

3. The immersion detection system according to claim 2, wherein the optical measurer sets the wavelength of the test light
    to a wavelength at which a minimum value of the effective return loss calculated by the determiner in a case where the immersion detection sensor is immersed is smaller than a maximum value of the effective return loss calculated by the determiner in a case where the immersion detection sensor is not immersed.

4. The immersion detection system according to claim 2, wherein the determiner sets
    the threshold to a value between a maximum value of the effective return loss calculated by the determiner in a case where the immersion detection sensor is not immersed and a minimum value of the effective return loss calculated by the determiner in a case where the immersion detection sensor is immersed.

5. An immersion detection method for performing:
    configuring an immersion detection sensor by connecting two optical fibers in series such that end faces of the two optical fibers abut on each other with a predetermined gap;
    configuring an optical transmission line by connecting a plurality of the immersion detection sensors in series with the optical fibers;
    inputting test light with a plurality of wavelengths to the optical transmission line;
    measuring a return loss of the test light at the immersion detection sensor for each of the wavelengths and for each of the immersion detection sensors;
    averaging, for each of the immersion detection sensors, the return losses for each of the wavelengths; and
    performing threshold determination on the presence or absence of immersion.

6. The immersion detection method according to claim 5, wherein in the threshold determination,
    averaging the return losses for each of the wavelengths on a linear scale to calculate an effective return loss;
    setting a threshold in the threshold determination on the basis of a difference between an effective return loss in a case where a medium which the predetermined gap is filled with is air and an effective return loss in a case where a medium which the predetermined gap is filled with water; and
    determining that immersion of the immersion detection sensor occurs, when the calculated effective return loss is larger than the threshold.

7. The immersion detection method according to claim 6, wherein the wavelength of the test light is set
    to a wavelength at which a minimum value of the effective return loss calculated in a case where the immersion detection sensor is immersed is smaller than a maximum value of the effective return loss calculated in a case where the immersion detection sensor is not immersed.

8. The immersion detection method according to claim 6, wherein the threshold is set
    to a value between a maximum value of the effective return loss calculated in a case where the immersion detection sensor is not immersed and a minimum value of the effective return loss calculated in a case where the immersion detection sensor is immersed.

* * * * *